Aug. 18, 1942.　　E. W. VON KNAUF　　2,293,271
MAKE-UP DEMONSTRATION APPARATUS
Filed Sept. 29, 1941　　3 Sheets-Sheet 1
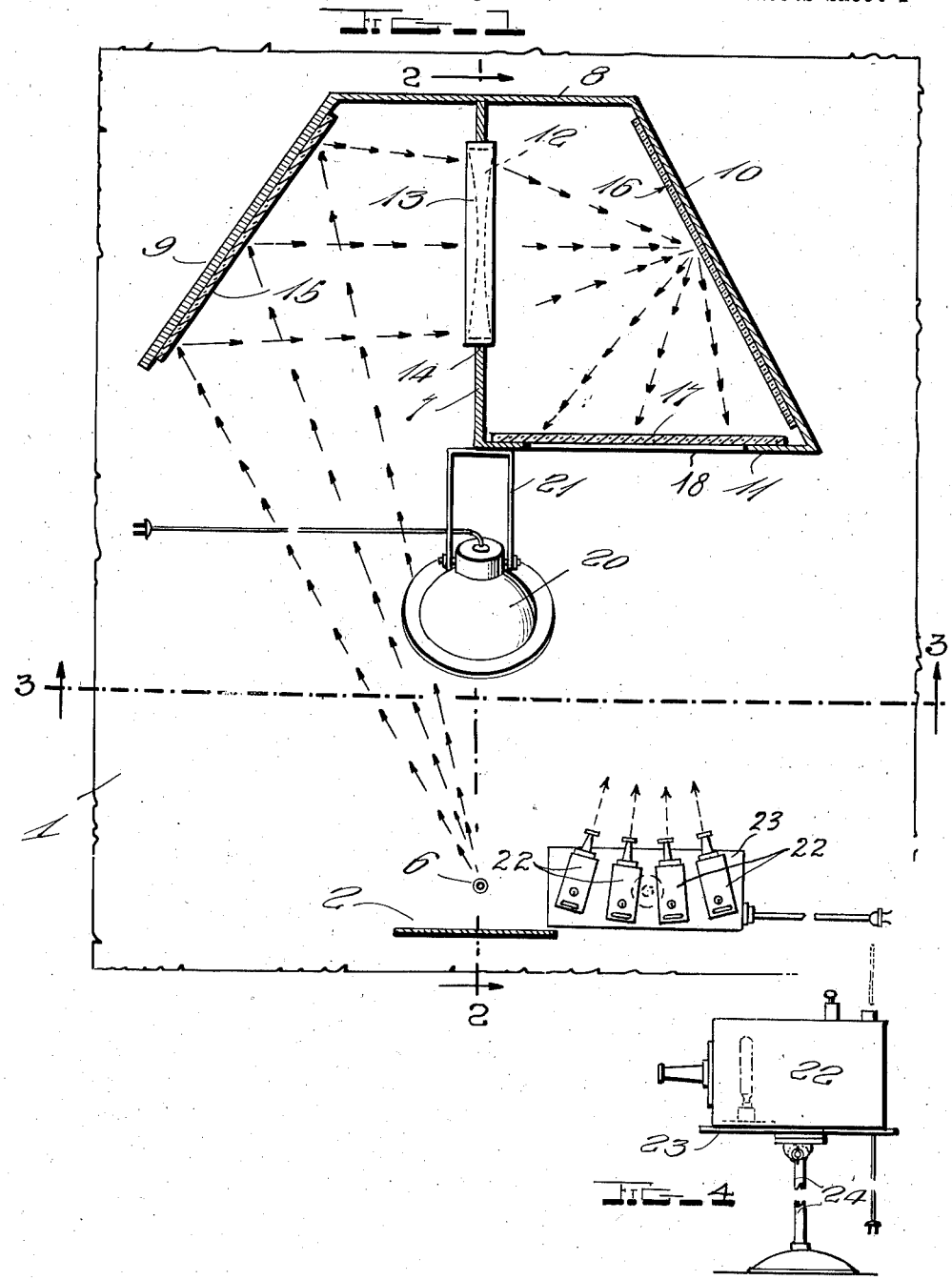
INVENTOR.
Emil W. von Knauf,
BY
ATTORNEY

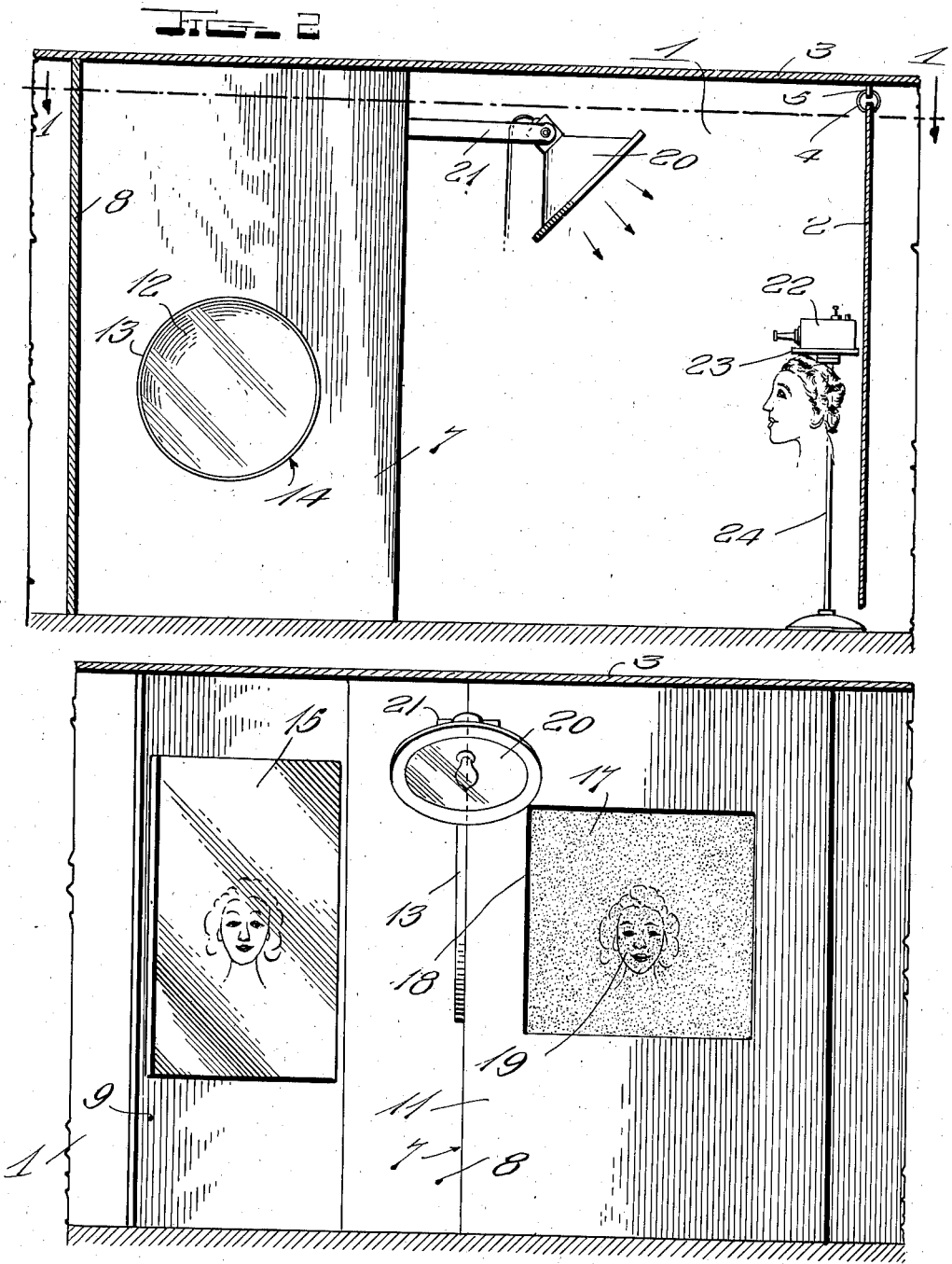

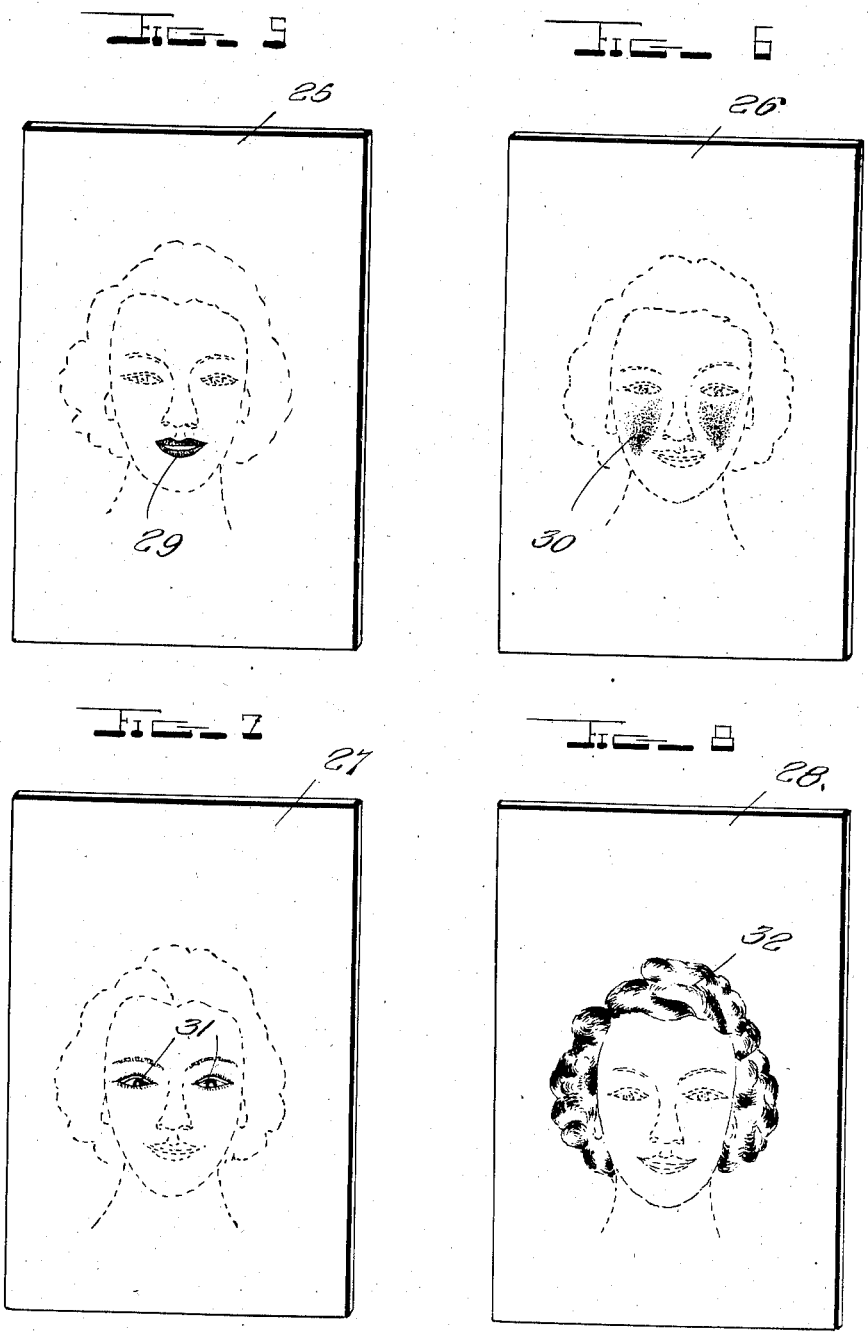

Patented Aug. 18, 1942

2,293,271

UNITED STATES PATENT OFFICE 2,292,271

MAKE-UP DEMONSTRATION APPARATUS

Emil W. von Knauf, Chicago, Ill.

Application September 29, 1941, Serial No. 412,868

5 Claims. (Cl. 35—59)

This invention relates to a make-up demonstration apparatus for use by cosmeticians and studios, and it is an object of the invention to provide an apparatus of this character by the use of which any individual may see the effect which will be produced when her face and hair are made up in a certain manner. It will thus be seen that the individual may see and approve the effect which will be produced before purchasing cosmetics for her face or hair treatment in a manner suggested by herself or the operator.

Another object of the invention is to provide an apparatus of this character which includes a panel to receive a reflection of the individual and a set of projectors by the use of which effects resulting from the use of rouge and lip stick, as well as eye shading of various colors and tones may be produced upon the reflection of the individual and also various styles of coiffure. By this arrangement, the customer may select the coiffure and make-up best suited to her type.

Another object of the invention is to provide an apparatus wherein mirrors and a lens are so arranged that when an individual sits in front of a background, a very precise or exact reproduction of the individual will be disclosed upon a ground glass panel, in full view of the individual and the operator, who will then insert cards bearing pictorial representations of various types of make-up and styles of hair dress into reflecting projectors and successively superimpose them over each other onto the reflection of the individual until the desired suitable combination has been found.

Another object of the invention is to provide an apparatus of this character which is simple in construction, easy to erect, and very easy to operate.

In the accompanying drawings:

Fig. 1 is a semi-diagrammatic horizontal sectional view on the line 1—1 of Fig. 2, showing the manner in which the apparatus operates.

Fig. 2 is a sectional view taken vertically on the line 2—2 of Fig. 1.

Fig. 3 is a view taken transversely through Fig. 1, on the line 3—3 thereof.

Fig. 4 is a side elevation of the projectors.

Fig. 5 is a view of a card showing lips with one type of make-up.

Fig. 6 is a view of a card showing a face treated with one type of rouge.

Fig. 7 is a card showing one type of eye-make-up.

Fig. 8 is a card showing one style of hair dress.

My improved apparatus is for use of cosmeticians and beauty parlor operators and will be portable or erected in a booth, which may be of conventional dimensions and is indicated in general by the numeral 1. The individual occupies a chair in front of a curtain or panel 2, which constitutes a background and is preferably black, in order that the individual's head will be clearly set off. The background or panel may be mounted in any desired manner but has been shown suspended from the top 3 of the booth 1 by a suitable number of rings 4 which engage through eyes 5. The chair occupied by the individual may be referred to as the customer's station and is indicated in Fig. 1, by the numeral 6, it being understood that this station will be located in advance of the background 2 a sufficient distance to permit an operator to walk back of the individual from one side to the other.

A vertical partition 7 extends longitudinally of the booth and has its rear edge in abutting engagement with a vertically disposed rear wall or panel 8 midway the width thereof. Panels or walls 9 and 10 extend forwardly from opposite side edges of the panel 8 and are disposed diagonally so that they diverge forwardly, the forward edges of the panels 7 and 10 being secured to or formed integral with opposite side edges of a panel or wall 11. A lens 12 having a frame 13, is set into an opening 14 formed in the panel or partition 7 and opposite this lens the panel or wall 9 carries a mirror 15, the angle of the wall 9 being such that when an individual is seated at the customer's station 6, the individual's head will be reflected from the mirror through the lens 12 onto a second mirror 16 which is mounted against the wall 10 and directs the reflection of the individual's head onto the rear surface of a sheet of ground or frosted glass 17. This sheet of glass is mounted against the rear surface of the panel or wall 11 in covering relation to an opening 18 formed therein, and the reflection 19 on the glass will be in full view of the individual and the operator standing nearby. While only the head has been shown in the mirror 15 and on the glass sheet or screen, in Fig. 3 of the drawings, it will be understood that other portions of the body may also be included, a reflection of the head alone being accomplished by placing a shield of black cloth or the like across the individual below the neck, so that this shield blends into the background panel 2 and only the head and neck appear on the screen 17. The individual is illuminated through the medium of an overhead light 20 which may be carried by a bracket 21 secured against the wall or panel 11, it being understood that the light may be mounted in other positions where a good flood-light effect may be directed upon the individual.

The projecting lanterns 22 are of conventional construction and are of the type intended to have postcards and the like placed therein reflected against a screen or wall. These projectors or lanterns are shown mounted on a platform 23 carried by a pedestal 24, but it is to be understood that other mountings may be had for the projectors. The projectors are placed above and as close to the individual's head as possible to avoid any angle distortion by the reflecting functions of the demonstrating cards.

After the individual is seated and the reflection appears on the screen 17, the operator places cards in the projectors and pictorial matter on these cards will be thrown upon the screen. Four of the cards, indicated by the numerals 25, 26, 27 and 28, are illustrated in Figs. 5, 6, 7 and 8 of the drawings, it being understood that each represents one of a series or set of such cards.

The cards 25 are used for demonstrating the effects produced when lip sticks of various colors and hues are employed, and each has printed thereon lips 29 of one of a number of different colors and hues.

The cards 26 are for demonstrating rouge and other face tinting lotions of various colors and shades, the face portion of the head being indicated by the numeral 30 in Fig. 6, and the rest of the head by dotted lines.

The cards 27 are for demonstrating eye make-up and the cards of this set have the eyes 31 made up in various manners and shades.

The cards 28 are for demonstrating various coiffures and also for showing their adaptability to the individual. The hair is designated by the numeral 32 and other portions of the head are indicated by dotted lines.

After the cards are placed in the projectors, the projectors are adjusted so that the colored portions 29, 30, 31, and 32 are properly located with respect to the reflection of the individual's head on the screen 17, and the result may then be inspected by the individual as well as by the operator. If it is found that the colors do not blend properly for a good effect, or the type of hair dress is not suitable for the individual, the proper cards are removed from the projectors and others substituted until a satisfactory combination is obtained.

Having thus described the invention, what is claimed is:

1. A make-up demonstrating apparatus comprising a customer's station, a ground glass screen in advance of the customer's station, a mirror disposed diagonally in a vertical plane forwardly of and to one side of the screen in cooperating relation to the customer's station, a second mirror disposed diagonally in a vertical plane back of the screen in position for receiving a reflection of a customer from the first mirror and directing the reflection onto the screen for observation by the customer and by an attendant, a lens mounted vertically between the mirrors, means for illuminating the said customer, a battery of projecting machines, and one or more sets of cards, each set consisting of one or more cards having thereon pictorial representations of a corresponding respectively different portions of a person's head subjected to various kinds and styles of make-up, the cards being insertable into the projecting machines whereby they may be projected onto the screen in cooperating relation to corresponding portions of the customer's reflection thereon and demonstrate effects to be produced by use of predetermined make-up.

2. A make-up demonstrating apparatus comprising a customer's station, means for illuminating a customer at the station, a screen of light penetratable material in advance of the customer's station, means for catching a reflection of said customer, projecting lanterns, and one or more sets of cards, the cards of each set bearing respective pictorial representations of various kinds of make-up adapted to be inserted into the lanterns and projected thereby onto the screen in cooperating relation to corresponding portions of the reflection of the customer for demonstrating effects produced upon the customer by use of corresponding make-up.

3. A make-up demonstrating apparatus comprising a screen, means for catching a reflection of a person and directing same on the screen, one or more sets of cards, the cards of each set bearing respective representations of various kinds of make-up for a corresponding portion of the person's head, and means for projecting reflections of cards selected from the sets of cards onto the screen in cooperating relation to the corresponding portions of the reflection of the person and thus demonstrating effects to be produced by the use of corresponding make-up.

4. A make-up demonstrating apparatus comprising a background for a customer's station, a rear wall disposed vertically and extending transversely of the customer's station, a vertical partition extending forwardly from the rear wall intermediate the width thereof, panels extending forwardly from the opposite side edges of the rear wall diagonally thereof and in diverging relation to each other, a front panel disposed vertically between the partition and one diagonal panel and formed with an opening, a screen of light penetrable material carried by the front wall and exposed through the opening therein, mirrors carried by the diagonally extending panels, a lens mounted within said partition and cooperating with the mirrors for directing a reflection of a person at the customer's station onto the screen, one or more cards bearing respective representations of styles of hair dress, lip colors and make-up for portions of a person's face, and means for projecting reflections of selected cards onto the screen for cooperating with a person's reflection upon the screen and demonstrating effects producible by use of corresponding make-up.

5. A make-up demonstrating apparatus comprising a rear wall, panels extending forwardly from the rear wall and diverging forwardly, a partition extending forwardly form the rear wall between the panels, a front wall formed with an opening, a screen carried by the front wall and exposed through the opening, mirrors carried by the panels, a lens carried by the partition and cooperating with the mirrors for directing a reflection of a person onto the screen, one or more sets of members bearing respective representations of make-up for corresponding portions of a person's head, and means for projecting respective reflections of the make-up depicted upon the members onto the screen and thus demonstrating effects producible when corresponding make-up is used on said person.

EMIL W. VON KNAUF.